Nov. 24, 1964   D. G. TILLINGHAST ETAL   3,158,386
STRESS REMOVABLE SPLASH GUARD
Filed March 16, 1962
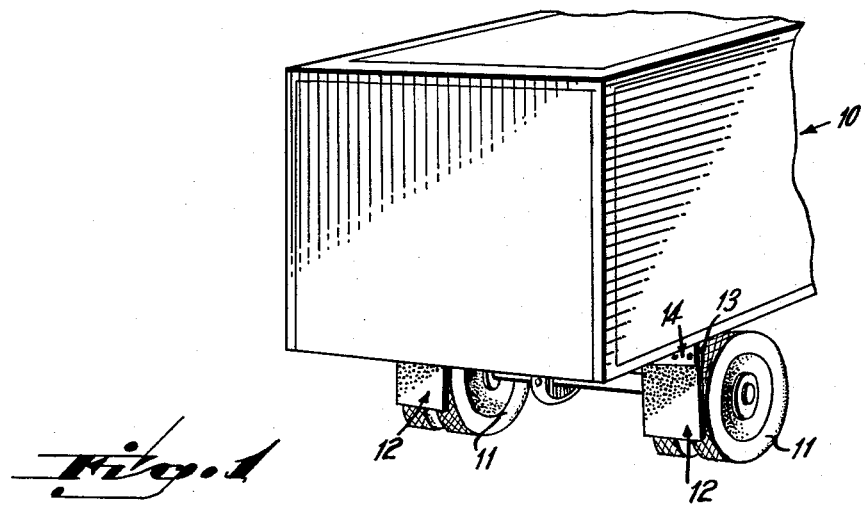
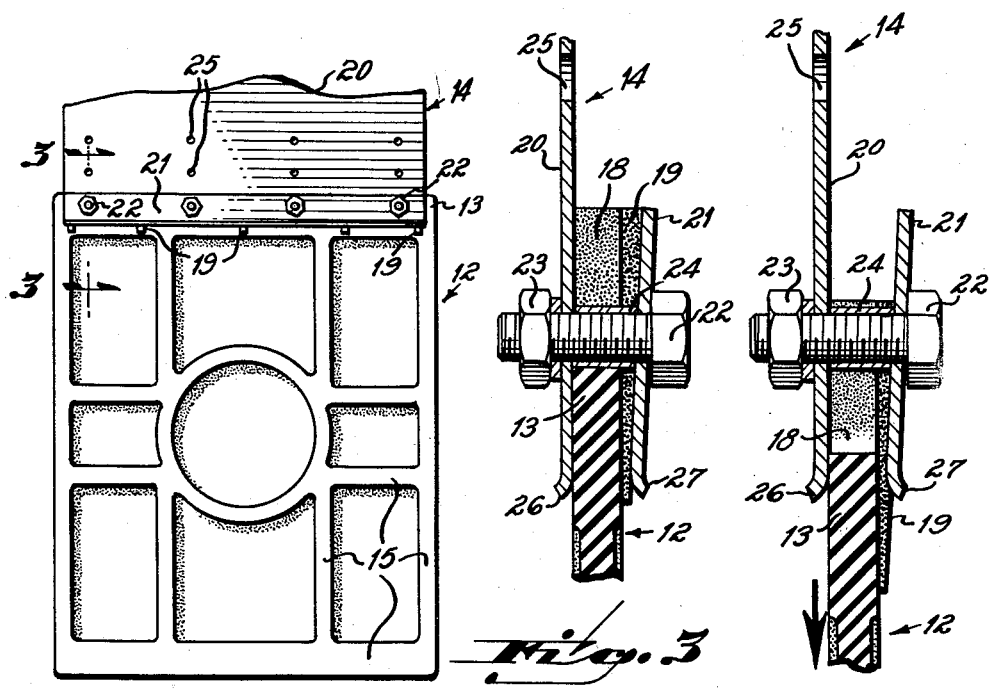
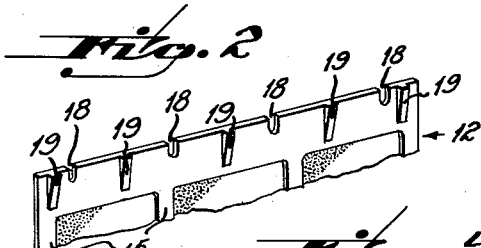
INVENTORS
David L. Tillinghast
Gerald J. Kunze
BY Wood, Herron and Evans
ATTORNEYS 3,158,386
STRESS REMOVABLE SPLASH GUARD
David G. Tillinghast and Gerald J. Kunze, Cincinnati, Ohio, assignors, by mesne assignments, to Pullman Incorporated, a corporation of Delaware
Filed Mar. 16, 1962, Ser. No. 180,946
3 Claims. (Cl. 280—154.5)

This invention relates to a splash guard for trucks and other motor vehicles.

Splash guards are normally made of rubber or other flexible material and are secured at their upper edges to a vehicle to depend from the vehicle rearwardly of the rear wheels. In this position, muddy water, rocks and the like which are picked up by the wheels of the vehicle impinge on the splash guard.

Under certain conditions of normal operation, the splash guards will be torn off from the vehicle or will be so badly ripped as to seriously impair the splash guards from performing their desired functions. For example, when the vehicle is backed into a high curb, the splash guard may become clamped between the curb and the rear wheels with consequent extraordinary tensile stress being applied to the guard. The stress may rip it from its point of attachment or rip the splash guard itself. Since these occasional severe stresses cannot be avoided, it is desirable to avoid the deleterious effects of the stresses, that is, to avoid complete destruction of the utility of the splash guard.

One approach to the problem is disclosed in co-pending application Serial No. 151,958 filed November 13, 1961, now Patent No. 3,095,215. In that application, the solution to the problem is to impart a preselected tear line to the splash guard along the top edge thereof so that in the event of an imposition of great stress to the splash guard, the splash guard will tear along the preselected line resulting in the removal of only a fraction of an inch of the splash guard.

An objective of the present invention has been to provide a mount for a splash guard which will permit the splash guard to be forcibly removed from the mount but without destroying any portion of it. To this end, the invention provides for the integral molding of inwardly directed wedges or tapered beads along the top edge of a splash guard, these wedges normally being secured between two simple clamping plates but being adapted to be compressed upon application of stress to the splash guard so that they can slide out from between the clamping plates.

The splash guard design, employing an integrally molded compressible wedge construction, provides a solution to splash guard destruction without adding measurably to the cost of the guard and its mount and without requiring the removal of any portion of the guard.

The several features of the invention will become more readily apparent from the following detailed description taken in conjunction with the accompanying drawings in which:

FIG. 1 is a fragmentary perspective view of a truck employing the invention;

FIG. 2 is an elevational view of a splash guard in its mount in accordance with the invention;

FIG. 3 is a cross sectional view along lines 3—3 of FIG. 2;

FIG. 4 is a view similar to FIG. 3 showing the splash guard partially removed, and FIG. 5 is a fragmentary perspective view of the top edge of the splash guard.

Referring to the drawings, the rear portion of a vehicle 10 is illustrated to show its rear wheels 11 each having a splash guard 12 depending rearwardly thereof. The splash guard 12 is secured at its upper end 13 to a mounting device 14 which is fixed to the vehicle chassis.

The splash guard 12 is preferably molded from rubber with any type of ribbed configuration as indicated at 15 which will tend to strengthen the splash guard against inadvertent tearing.

As best illustrated in FIG. 5, the upper edge of the splash guard has a plurality of slots 18, four being shown, and a plurality of integrally molded, inwardly directed wedges 19 alternating with the slots 18.

The mount 14 for the upper edge 13 of the splash guard 12 is formed by a fixed plate 20, mounted on the vehicle, and a movable plate 21 which is secured to the fixed plate by a bolt 22 and nut 23. A bushing 24 surrounding the bolt 22 may be provided to space the movable plate 21 a preselected distance from the fixed plate 20. The fixed plate 20 is provided with holes 25 by which it may be bolted to the vehicle 10.

In the operation of the invention, the splash guard 12 is clamped at its upper edge 13 to the mount 14 by sandwiching the upper end between the fixed plate 20 and the movable plate 21. The bolt 22 passes through the bolt slots 18 in the upper edge of the splash guard. The nut 23 is tightened on the bolt 22 until the movable member 21 securely clamps the wedges 19 between it and the fixed plate 20. That clamped position could be fixed by the length of the bushings 24 in order to provide assurance that the wedges are clamped tightly enough to prevent the falling off of the splash guard but not so tightly as to prevent the removal of the splash guard without tearing under the application of severe stress.

When the splash guard is properly clamped in position, its relationship to the mount 14 is as illustrated in FIGS. 2 and 3. It should be noted that the lower edges of the plates 20 and 21 are curled as at 26 and 27 respectively to prevent the wearing of the splash guard as it swings back and forth in the mount.

When the splash guard is subjected to severe tensile stress in the direction of the arrow in FIG. 4, the wedges 19 will slide downwardly between the plates 20 and 21. The resiliency of the soft rubber wedges is sufficient to permit the wedges to compress as they slide between the plates 20 and 21 thus permitting the top edge of the splash guard to free itself from the mount without tearing.

It should be understood that the splash guard need not be made of an integrally molded rubber sheet. Rather, and by way of example, the splash guard could be made from a composition material and the wedges 19 made from a distinctly different material adhesively secured to the upper edge of the splash guard. The important consideration is that the splash guard should have a resistance to tearing which is substantially greater than the wedges resistance to deformation as the wedges are pulled through the clamping plates 20 and 21. The resistance of the wedges to deformation can be regulated in part by the shape of the wedges, the width of the wedges, and the spacing of the clamping members 20 and 21 from each other.

What is claimed as new is:
1. A splash guard comprising
   a sheet of flexible material,
   said sheet having a plurality of spaced bolt receiving slots at the upper edge thereof,
   a plurality of inwardly directed wedges of compressible material spaced along the top of said sheet,
   a fixed plate and a movable plate clamping the top edge of said sheet therebetween,
   and bolts passing through said plates and the slots in said sheet for securing said movable plate to said fixed plate.

2. In a vehicle, a splash guard comprising
a sheet of flexible material,
a plurality of inwardly directed wedges of compressible material integral with said sheet and spaced along the top of said sheet,
a plate fixed to said vehicle above a rear wheel thereof and a movable plate clamping the top edge of said sheet therebetween,
and bolts passing through said plates for securing said movable plate to said fixed plate.

3. In a roadway vehicle, a splash guard comprising
a sheet of flexible material,
a plurality of inwardly directed wedges of compressible material spaced along the top of said sheet and molded integrally with said sheet,
a plate adapted to be fixed to said vehicle, a movable plate, and means for clamping said fixed plate to said movable plate to clamp said wedges therebetween.

References Cited in the file of this patent
UNITED STATES PATENTS

| | | |
|---|---|---|
| 2,106,992 | Bahr | Feb. 1, 1938 |
| 2,139,307 | Jackson | Dec. 6, 1938 |
| 2,777,710 | Panchesine | Jan. 15, 1957 |
| 3,051,508 | Federspiel | Aug. 28, 1962 |

FOREIGN PATENTS

| | | |
|---|---|---|
| 321,968 | Italy | Oct. 23, 1934 |
| 604,068 | Great Britain | June 28, 1948 |